UNITED STATES PATENT OFFICE.

VICTOR VINCENT, OF QUIMPER, FRANCE.

PROCESS FOR THE DIRECT EXTRACTION OF IODIN FROM FRESH OR DRIED MARINE ALGÆ.

1,249,863.

Specification of Letters Patent.   Patented Dec. 11, 1917.

No Drawing.   Application filed December 26, 1916.   Serial No. 138,979.

*To all whom it may concern:*

Be it known that I, VICTOR VINCENT, a citizen of the Republic of France, resident of Quimper, France, (post-office address Station Agronomique de Quimper, Quimper, France,) have invented a new and useful Process for the Direct Extraction of Iodin from Fresh or Dried Marine Algæ, which manufacture is fully set forth in the following specification.

Iodin is generally produced by treating the ashes obtained by the combustion of marine algæ. The ashes containing iodin in the form of alkaline iodids are lixiviated, the lyes are then concentrated, and iodin is precipitated from the solutions by means of extracting agents in acid solution, for instance, hydrochloric acid and potassium chlorate, sulfuric acid and bichromate of potassium.

This invention relates to a process for the extraction of iodin not by the treatment of the ashes, but by the direct treatment of the algæ in a green or in a dry state.

Fresh algæ which belong to the genus *Laminaria*, such as *L. digitata*, *L. flexicaulis*, *L. saccharina* or *Saccharyza bulbosa*, *L. macrocystis*, *L. nereocystis*, etc., are treated completely, both the frond and the stem, with a slightly acidulated solution of commercial sulfate of aluminum, for the purpose of obtaining alkali metal iodid solutions. The stems of *Saccharyza bulbosa* and of the *Laminaria flexicaulis* are split into four parts, for the purpose of assisting extraction.

In order to obtain as complete an exhaustion or extraction as possible, the algæ are placed in extraction tanks or vats, of any desired number, preferably five or six, forming a battery, and the liquid is circulated from one tank to another so that the fresh solution comes into contact with the algæ which have become more nearly exhausted, and the concentrated solution passes in the last stage over algæ which have not yet been treated. The extraction is therefore a progressive one.

The extraction is carried out cold, and the period of contact in each tank is about four hours. This period of contact varies, as will be readily understood, according to the number of tanks used. For the preparation of the extraction solution, more or less sulfate of aluminum can be used. Four to five kgs. per thousand may be mentioned by way of example; the solution in fresh water (or preferably in sea water which dissolves the fucose and gelose less efficiently) being slightly acidulated. After contact in each vat, the proportion of sulfate of ammonium is brought back to 4 to 5 kgs. per thousand before introducing the solution into the next vat.

The concentrated solution, on coming out from the last tank, is collected, and crystallized copper sulfate and sulfuric acid are added to it. The proportions vary, for instance they may be 7-8 parts of crystallized copper sulfate to 1 part of iodin in solution and 1.5 parts per thousand of sulfuric acid. The whole is left to stand for several hours, and filtered through a sand filter in order to keep back the matters in suspension. The clarified liquid is then treated with a current of sulfur dioxid. or by the addition of a sulfite, a bisulfite, or a metabisulfite. The best proportions to be used are 2-3 parts of sulfurous anhydrid ($SO_2$) to one part of iodin. Cuprous iodid ($Cu_2I_2$) is then formed, which is at once precipitated. At the end of about one hour, the reaction is complete. The precipitate is separated from the mother-liquor by centrifugal action, for instance by means of centrifugal filters rotating at a high speed.

In a slow process of extraction, it is sufficient to leave the solution at rest for 48 hours in order to obtain 90% of the iodin in the form of cuprous iodid. After 72 hours of rest, the yield varies from 95 to 98%.

When it has been possible to dry the algæ before treatment, the extraction solution is preferably prepared with sulfate of iron (ferrous sulfate). The proceedings are the same as in the case of sulfate of alumina. The proportions of sulfate of iron may vary, but are preferably 4-5 kgs. per thousand calculated in anhydrous state. The final solution withdrawn from the last tank, is treated with sulfuric acid in order to obtain a solution of about 3 parts per thousand. The gelose and the fucose carried away, are at once precipitated, and after a period of four hours or more, a clear liquid can be obtained by filtering through sand. This liquid, after the addition of copper sulfate in the proportions hereinbefore indicated, and after treatment with sulfurous anhydrid for obtaining a 2–3 parts per thousand solution, gives cuprous iodid which is collected by centrifugal action, as in the case of treatment of fresh algæ. In slower extraction, it is possible to bring about spontaneous deposition of cuprous iodid in the same conditions of efficiency as those mentioned above. In both cases (treatment of fresh algæ or treatment of dried algæ), the cuprous iodid is treated either so as to obtain iodin or to prepare alkali metal iodids or organic and mineral iodin compounds.

The iodin is disengaged from the cuprous iodid by heating in retorts, at a temperature of 400–500° C., cuprous iodid mixed with an oxidizing agent, for instance with dioxid of manganese, or alone. In the latter case it is exposed to the action of a hot current of air (about 200° C.).

The iodin vapors carried away, are condensed in receptacles either simple or provided with baffle plates, simultaneously giving iodin in different physical forms and of different degrees of purity.

If it is desired to obtain alkali metal iodids, potassium and sodium iodids are prepared by heating cuprous iodid between 300 and 400° C. with dry carbonates of potassium and sodium. The reaction is a complete one, and without losses. Extraction is effected with boiling water. Neutralization with sulfuric acid which destroys any traces of iodate formed, and concentration are carried out successively in order to withdraw first the sulfates of potassium or sodium formed, and then the iodids. The iodid of sodium is thereupon dehydrated.

It is possible to recover the products used, and to obtain by-products.

(1) The algæ quickly washed in this process retain almost completely potassium salts, phosphates, nitrogenous and hydrocarbon substances which give them a remarkable value as manure. The algæ are dried and compressed, in order to bring them on the market as manure.

(2) Alumino-cuprous solutions discharged from the centrifugal apparatus, are partly neutralized, either by lime, or by soda or its carbonate. Aluminum alone is separated and collected in filter-presses. Complete neutralization of the filtered solution gives copper hydrate which is separated in the same way. The aluminum and copper hydrates obtained, dissolved by diluted sulfuric acid, regenerate the original aluminum and copper sulfate solutions utilized in the extraction of fresh algæ.

(3) By treating in the same way ferrocuprous solutions, ferric hydrate and copper hydrate can be collected separately. Same treatment as above.

(4) Decomposition of cuprous iodid in the preparation of iodin and of iodids, leaves copper oxid (CuO) which, on being treated with sulfuric acid, produces copper sulfate.

These recoveries show that in the process, when using fresh algæ as raw material, only sulfuric acid and neutralizing agents of small value are wasted, while masses of algæ of a high fertilizing value are left.

What I claim as my invention and desire to secure by Letters Patent is:—

1. A process for the direct extraction of iodin from fresh marine algæ, consisting in treating the algæ with solutions containing aluminum sulfate, treating the resulting alkali metal iodin solution with copper sulfate and sulfurous anhydrid or sulfites, separating the precipitate of cuprous iodin, and separating iodin from the said precipitate.

2. A process for the direct extraction of iodin from marine algæ, consisting in treating the algæ with a sulfate solution, treating the resulting alkali metal iodin solutions with copper sulfate and sulfurous anhydrid or sulfites, separating the precipitate of cuprous iodid, and separating iodin from the said precipitate.

3. A process for the direct extraction of iodin from marine algæ, consisting in treating the algæ with solutions containing an extracting agent; adding copper sulfate and sulfuric acid to the solution thus obtained; treating the resultant solution with sulfurous anhydrid; separating the precipitated cuprous iodid; and separating iodin from the precipitate.

4. A process for the direct extraction of iodin from marine algæ, consisting in treating the algæ with solutions containing a metal sulfate, to obtain an alkali metal iodid solution; treating the iodid solution with copper sulfate and sulfurous anhydrid; separating the precipitated cuprous iodid; and separating the iodin from the precipitate.

5. A process for the direct extraction of iodin from fresh marine algæ, consisting in treating the fresh algæ with solutions containing aluminum sulfate, to obtain an alkali metal iodid solution; adding copper sulfate and sulfuric acid to the iodid solution; treating the resultant solution with sulfurous anhydrid; separating the precipitated cuprous iodid; and separating iodin from the precipitate.

6. A process for the direct extraction of iodin from marine algæ, consisting in treating the algæ with solutions containing a metal sulfate, to obtain an alkali metal iodid solution; treating the iodid solution with copper sulfate and sulfurous anhydrid; separating the precipitated cuprous iodid; and separating the iodin from the cuprous iodid by the action of heat alone and exposing it to the action of a hot current of air at about 200° C.

In testimony whereof I have signed this specification in the presence of two subscribing witnesses.

VICTOR VINCENT.

Witnesses:
ACHILLE WIKAND,
HENRY L. BARON,